(12) United States Patent
Zhuravlev

(10) Patent No.: US 11,715,288 B2
(45) Date of Patent: *Aug. 1, 2023

(54) OPTICAL CHARACTER RECOGNITION USING SPECIALIZED CONFIDENCE FUNCTIONS

(71) Applicant: ABBYY Development Inc., Dover, DE (US)

(72) Inventor: Aleksey Zhuravlev, Yaroslavl (RU)

(73) Assignee: ABBYY DEVELOPMENT INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,481

(22) Filed: Oct. 5, 2021

(65) Prior Publication Data
US 2022/0027662 A1 Jan. 27, 2022

Related U.S. Application Data

(63) Continuation of application No. 16/178,987, filed on Nov. 2, 2018, now Pat. No. 11,164,035.

(30) Foreign Application Priority Data

Oct. 31, 2018 (RU) .......................... RU2018138377

(51) Int. Cl.
*G06V 10/82* (2022.01)
*G06F 18/21* (2023.01)
(Continued)

(52) U.S. Cl.
CPC ............ *G06V 10/82* (2022.01); *G06F 18/217* (2023.01); *G06V 30/18057* (2022.01); *G06V 30/10* (2022.01)

(58) Field of Classification Search
CPC ..... G06V 10/462; G06V 30/10; G06K 9/6262
See application file for complete search history.

(56) References Cited

U.S. PATENT DOCUMENTS 8,553,968 B1 10/2013 Lee et al.
10,025,950 B1 7/2018 Avasarala et al.
(Continued)

FOREIGN PATENT DOCUMENTS

| CN | 106157319 A | 11/2016 |
|---|---|---|
| CN | 106951867 A | 7/2017 |
| CN | 107292887 A | 10/2017 |

OTHER PUBLICATIONS

Z. Ming et al (Z. Ming, J. chazalon, M. M. Luqman, M. Visani and J. Burie, "Simple Triplet Loss bAsed on Inra/Inter-Class metric Learning for Face Verification," 2017 IEEE International Conference on Computer vision Workshops (ICCVW), Venice, 2017, pp. 1656-1664). (Year: 2017.

(Continued)

*Primary Examiner* — David Perlman
(74) *Attorney, Agent, or Firm* — Lowenstein Sandler LLP

(57) ABSTRACT

Systems and methods for optical character recognition using specialized confidence functions. An example method comprises: receiving a grapheme image; computing a feature vector representing the grapheme image in a space of image features; and computing a confidence vector associated with the grapheme image, wherein each element of the confidence vector reflects a distance, in the space of image features, between the feature vector and a center of a class of a set of classes.

20 Claims, 7 Drawing Sheets

(51) Int. Cl.
*G06V 30/18* (2022.01)
*G06V 30/10* (2022.01)

(56) References Cited

U.S. PATENT DOCUMENTS

| | | |
|---|---|---|
| 2005/0015251 A1 | 1/2005 | Pi et al. |
| 2005/0259866 A1 | 11/2005 | Jacobs et al. |
| 2014/0029839 A1 | 1/2014 | Mensink et al. |
| 2015/0055866 A1 | 2/2015 | Cummins et al. |
| 2017/0344848 A1 | 11/2017 | Lin et al. |
| 2017/0372174 A1 | 12/2017 | Wshah et al. |
| 2018/0077181 A1 | 3/2018 | Chen et al. |
| 2019/0026550 A1 | 1/2019 | Yang et al. |
| 2019/0065606 A1 | 2/2019 | Jiang et al. |
| 2019/0138853 A1 | 5/2019 | Goncalves et al. |
| 2019/0147304 A1 | 5/2019 | Liu et al. |

OTHER PUBLICATIONS

Wen, Yandong et al., "A Discriminative Feature Learning Approach for Deep Face Recognition", 17 pages, File was created on Jun. 9, 2016.

Westphal, Florian, ICDAR2017 Doctoral Consortium (in conjunction with ICDAR 2017) Kyoto, Japan, Blekinge Institute of Technology, Sweden, "Efficient Document Image Binarization using Machine Learning", Nov. 12, 2017, 3 pages.

Jindřich Libovický, Prague, 2015, Charles University in PragueFaculty of Mathematics and Physics Institute of Formal and Applied Linguistics, "Text Extraction from Image Data", 48 pages.

Cai, Jinzheng et al., "Improving Deep Pancreas Segmentation in CT and MRI Images via Recurrent Neural Contextual Learning and Direct Loss Function", 8 pages, Jul. 18, 2017.

Xinwei, He, Y. Zhou, Z. Zhou, S. Bai and X. Bai, "Triplet-Center Loss for Multi-view 3D Object Retreival," 2018 IEEE/CVF Conference on Computer Vision and Pattern Recognition, Salt Lake City, UT, 2018, pp. 1945-1954, doi: 10,1109/CVPR.2018.00208. (Year: 2018).

Liu W., Wen, Y., Yu, Z., & Yang, M. (Jun. 2016), Large-margin softmax loss for convolutional neural networks. In ICML (vol. 2, No. 3, p. 7). (Year: 2016).

U.S. Appl. No. 16/178,979, filed Nov. 2, 2018.

USPTO, Office Action for U.S. Appl. No. 16/178,979, dated Apr. 22, 2020.

USPTO, Final Office Action for U.S. Appl. No. 16/178,979, dated Jul. 24, 2020.

USPTO, Advisory Action for U.S. Appl. No. 16/178,979, dated Oct. 23, 2020.

USPTO, Office Action for U.S. Appl. No. 16/178,979, dated Dec. 18, 2020.

U.S. Appl. No. 16/178,987, filed Nov. 2, 2018.

USPTO, Office Action for U.S. Appl. No. 16/178,987, dated May 21, 2020.

USPTO, Final Office Action for U.S. Appl. No. 16/178,987, dated Dec. 17, 2020.

USPTO, Office Action for U.S. Appl. No. 16/178,987, dated Mar. 24, 2021.

USPTO, Notice of Allowance for U.S. Appl. No. 16/178,987, dated Jun. 30, 2021.

OPTICAL CHARACTER RECOGNITION USING SPECIALIZED CONFIDENCE FUNCTIONS

REFERENCE TO RELATED APPLICATIONS

The present application is a continuation of U.S. patent application Ser. No. 16/178,987, filed Nov. 2, 2018, which claims the benefit of priority under 35 U.S.C. § 119 to Russian Patent Application No. 2018138377 filed Oct. 31, 2018. Both above-referenced applications are incorporated by reference herein in their respective entireties.

TECHNICAL FIELD

The present disclosure is generally related to computer systems, and is more specifically related to systems and methods for neural-network-based optical character recognition using specialized confidence functions.

BACKGROUND

A convolutional neural network may be implemented as a feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field may be approximated mathematically by a convolution operation. Neurons from adjacent layers are connected by weighted edges. The edge weights and/or other network parameters are defined at the network training stage based on the training dataset.

SUMMARY OF THE DISCLOSURE

In accordance with one or more aspects of the present disclosure, an example method of neural-network-based optical character recognition using specialized confidence functions may comprise: receiving a grapheme image; computing, by a neural network, a feature vector representing the grapheme image in a space of image features; and computing a confidence vector associated with the grapheme image, wherein each element of the confidence vector reflects a distance, in the space of image features, between the feature vector and a center of a class of a set of classes, wherein the class is identified by an index of the element of the confidence vector.

In accordance with one or more aspects of the present disclosure, an example system for neural-network-based optical character recognition using specialized confidence functions may comprise a memory and a processor coupled to the memory. The processor may be configured to: receive a grapheme image; compute, by a neural network, a feature vector representing the grapheme image in a space of image features; compute a confidence vector associated with the grapheme image, wherein each element of the confidence vector reflects a distance, in the space of image features, between the feature vector and a center of a class of a set of classes, wherein the class is identified by an index of the element of the confidence vector; identify an element having a maximum value among elements of the confidence vector; and associate the grapheme image with a grapheme class corresponding to the identified element of the confidence vector.

In accordance with one or more aspects of the present disclosure, an example computer-readable non-transitory storage medium may comprise executable instructions that, when executed by a computer system, cause the computer system to: receive a grapheme image; compute, by a neural network, a feature vector representing the grapheme image in a space of image features; and compute a confidence vector associated with the grapheme image, wherein each element of the confidence vector reflects a distance, in the space of image features, between the feature vector and a center of a class of a set of classes, wherein the class is identified by an index of the element of the confidence vector.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
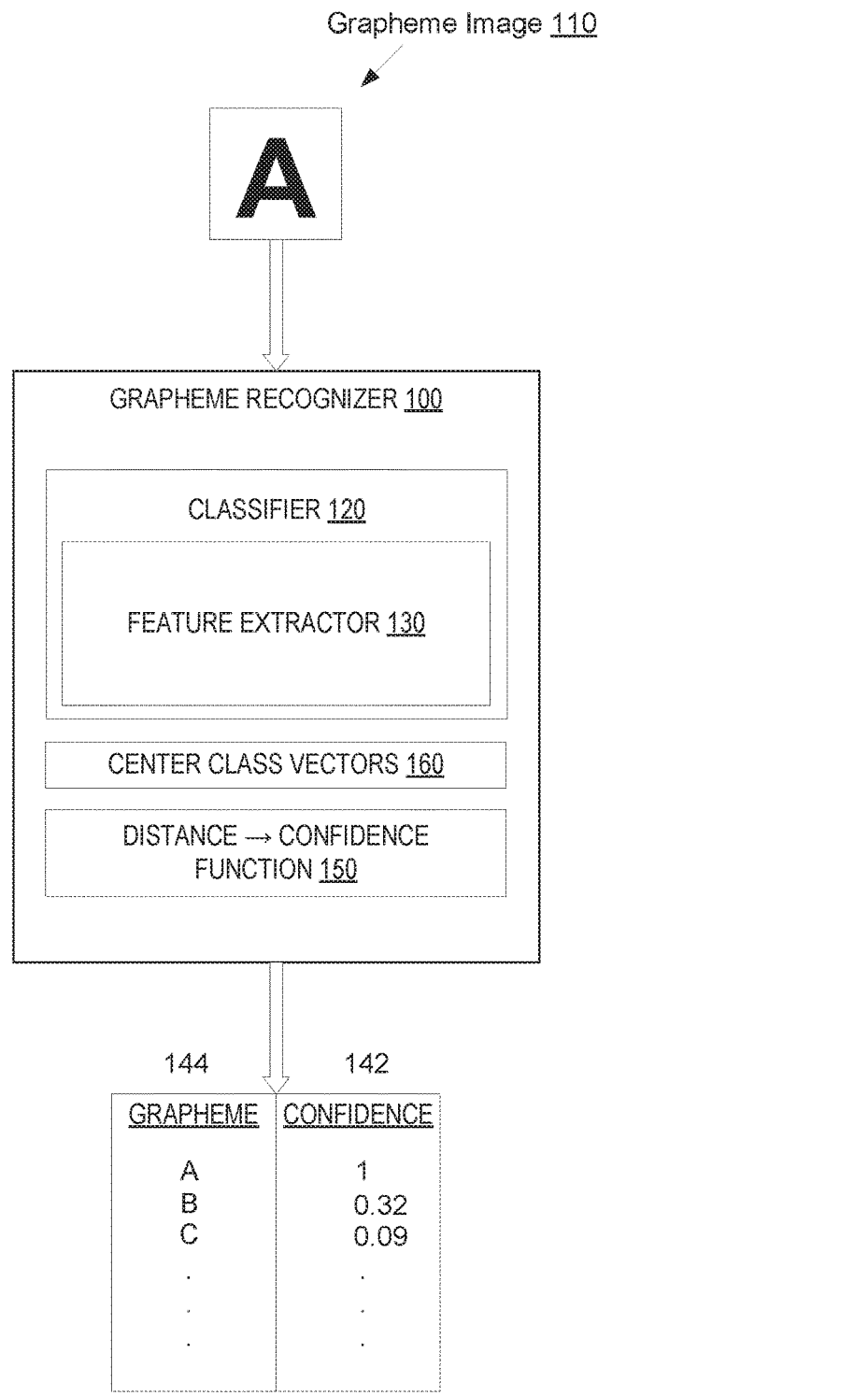
FIG. 1 schematically illustrates a functional structure of an example grapheme recognizer operating in accordance with one or more aspects of the present disclosure.

Described herein are methods and systems for neural network training utilizing specialized loss functions. In certain implementations, neural networks trained by the methods described herein may be utilized for performing various image classification tasks (e.g., optical character recognition (OCR)). The OCR process may extract computer-readable and searchable textual information from indicia-bearing images of various media (such as printed or handwritten paper documents, banners, posters, signs, billboards, and/or other physical objects bearing visible graphemes on one or more of their surfaces). "Grapheme" herein shall refer to the elementary unit of a writing system of a given language. A grapheme may be represented, e.g., by a logogram representing a word or a morpheme, a syllabic character representing a syllable, or an alphabetic characters representing a phoneme. In certain implementations, the OCR process may be performed by trainable convolutional neural networks.

A convolutional neural network may apply a set of functional transformations to a plurality of inputs (e.g., image pixels) and then utilize the transformed data to perform pattern recognition (e.g., grapheme recognition). The network training may involve activating the convolutional neural network for every input in the training dataset. A value of a loss function may be computed based on the observed output of a certain layer of the convolutional neural network and the desired output specified by the training dataset, and the error may be propagated back to the previous layers of the convolutional neural network, in which the edge weights and/or other network parameters may be adjusted accordingly. This process may be repeated until the value of the loss function would stabilize in the vicinity of a certain value or fall below a predetermined threshold.

Unlike various OCR methods in which the grapheme classification is based on human-selected or otherwise determined feature sets, convolutional neural networks may automatically define the feature sets as part of the network training. However, such automatically defined feature sets may be insufficiently specific for at least some of the graphemes. This may lead to the inability of a neural network, which has been trained to recognize graphemes of a certain alphabet, to distinguish the graphemes from other indicia or indicia-like images, such as images of graphemes from a different alphabet, partial grapheme images, groups of "glued" graphemes, and/or various graphical noise. In an illustrative example, images produced by incorrect line segmentation may exhibit feature values which would make them indistinguishable from valid graphemes; in other words, the neural network may not be capable to determine that such images are not valid graphemes, and thus would classify them as associated with a valid grapheme class.

Besides, efficient training of image processing neural networks to recognize invalid graphemes may be hindered by scarcity of available negative samples, which stems from the difficulty of producing all possible variations of invalid grapheme images, the number of which may significantly exceed the number of valid graphemes.

The neural network training methods described herein represent significant improvements over various common methods, by employing loss functions which are specifically aimed at training the network to recognize invalid or defective grapheme images, thus improving the overall quality and efficiency of optical character recognition. Furthermore, the methods of neural-network-based optical character recognition using specialized confidence functions described herein represent significant improvements over various common methods, by employing a confidence function which computes the distances, in the image feature space, between the feature vector representing the input image and vectors representing centers of classes of a set of classes, and transforms the computed distances into a vector of confidence values, such that each confidence value (e.g., selected from the range of 0-1) reflects the level of confidence of the hypothesis of the input grapheme image representing an instance of a certain class of the set of grapheme classes, as described in more detail herein below.

Various aspects of the above referenced methods and systems are described in details herein below by way of examples, rather than by way of limitation.

In general, OCR may involve analyzing and segmenting the input indicia-bearing image, detecting the alphabet and the language, recognizing the graphemes, re-constructing the logical structure of the imaged document, etc. Image segmentation errors would often adversely affect the subsequent stages of the OCR process, thus causing character recognition errors.

In an illustrative example, the image segmentation operation, which should split the initial image into text lines and/or individual graphemes, may yield one or more image fragments which in fact do not correspond to valid text lines or individual graphemes (e.g., by representing a partial grapheme image, a group of "glued" graphemes or partial graphemes, etc.). Since the image segmentation output is fed to the grapheme recognizer, a large number of graphemes which have been recognized with a low confidence may be indicative of erroneous image segmentation, in which case another variant of segmentation may be chosen or the segmentation operation would be repeated with a different set of parameters. However, should the confidence value yielded by the grapheme recognizer exceed a threshold value, the erroneous image segmentation may remain undetected, thus leading to undetected errors in grapheme recognition. Such circumstances may be mitigated by applying the confidence functions of the present disclosure, as described in more detail herein below.

FIG. 1 schematically illustrates a functional structure of an example grapheme recognizer 100 operating in accordance with one or more aspects of the present disclosure. The grapheme recognizer 100 processes the input grapheme image 110 by the classifier 120, which includes the feature extractor 130 employed to produce a feature vector corresponding to the input grapheme image 110. The classifier 120 transforms the feature vector into a vector of class weights, such that each weight would characterize the degree of association of the input image 110 with a grapheme class of a set of classes (e.g., a set of alphabet characters A, B, C, etc.), where the grapheme class is identified by the index of the vector element within the vector of class weights. The classifier 120 may than apply a normalized exponential function to transform the vector of class weights into a vector of probabilities, such that each probability would characterize a hypothesis of the input grapheme image 110 representing an instance of a certain grapheme class of a set of classes, where the grapheme class is identified by the index of the vector element within the vector of probabilities. In an illustrative example, the set of classes may be represented by a set of alphabet characters A, B, C, etc., and thus each probability of the set of probabilities produced by the classifier 120 would characterize a hypothesis of the input image representing the corresponding character of the set of alphabet characters A, B, C, etc.

However, as noted herein above, such probabilities may be unreliable, e.g., in the situation of incorrect initial image segmentation. The present disclosure alleviates this and other known deficiencies of common system and methods by employing a confidence function 150 which computes the distances, in the image feature space, between the class centers (which may be stored by the grapheme recognizer 100 in the memory as the class center vector 160) and the feature vector of the input image 110, and transforms the computed distances into a vector of confidence values 142, such that each confidence value (e.g., selected from the range of 0-1) reflects the level of confidence of the hypothesis of the input grapheme image 110 representing an instance of a certain class of the set of classes 144, where the grapheme class is identified by the index of the vector element within the vector of confidence values. In an illustrative example, the set of classes may correspond to a set of alphabet characters A, B, C, etc., and thus the confidence function 150 may produce a set of confidence values, such that each confidence value would characterize a hypothesis of the input image representing the corresponding character of the set of alphabet characters A, B, C, etc.

In certain implementations, the confidence value computed for each class of the set of classes by the confidence function 150 may be represented by the distance between the feature vector of the input image 110 and the center of the respective class. The grapheme recognizer 100 may select the grapheme class associated with the highest confidence value as the grapheme represented by the input image. In certain implementations, if the highest confidence value falls below a certain threshold, the grapheme recognizer may return an error code indicating that the input image does not depict a valid grapheme (e.g., more than one grapheme and/or a grapheme from a different alphabet may be present in the input image).

Figure 2:
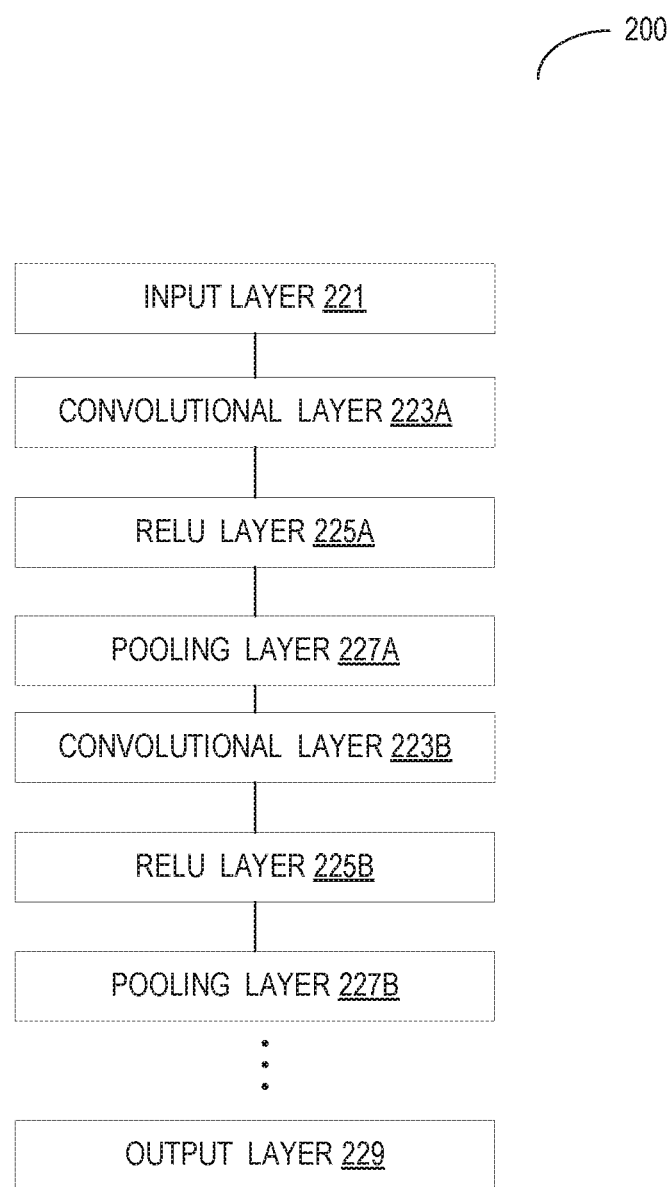
FIG. 2 schematically illustrates a functional structure of an example convolutional neural network operating in accordance with one or more aspects of the present disclosure.

In an illustrative example, the classifier 120 may be implemented as a convolutional neural network having a structure schematically illustrated by FIG. 2. The example convolutional neural network 200 may include a sequence of layers of different types, such as convolutional layers, pooling layers, rectified linear unit (ReLU) layers, and fully connected layers, each of which may perform a particular operation in recognizing the text in an input image. A layer's output may be fed as the input to one or more subsequent layers. As illustrated, convolutional neural network 200 may include an input layer 221, one or more convolutional layers 223A-223B, ReLU layers 225A-225B, pooling layers 227A-227B, and an output layer 229.

In certain implementations, an input image may be received by the input layer 221 and may be subsequently processed by a series of layers of convolutional neural network 200. Each of the convolution layers may perform a convolution operation which may involve processing each pixel of an input image fragment by one or more filters (convolution matrices) and recording the result in a corresponding position of an output array. One or more convolution filters may be designed to detect a certain image feature, by processing the input image and yielding a corresponding feature map.

The output of a convolutional layer (e.g., convolutional layer 223A) may be fed to a ReLU layer (e.g., ReLU layer 225A), which may apply a non-linear transformation (e.g., an activation function, which replaces negative numbers by zero) to process the output of the convolutional layer. The output of the ReLU layer 225A may be fed to the pooling layer 227A, which may perform a sub sampling operation to decrease the resolution and the size of the feature map. The output of the pooling layer 227A may be fed to the convolutional layer 223B.

Processing of the original image by the convolutional neural network 200 may iteratively apply each successive layer until every layer has performed its respective operation. As schematically illustrated by FIG. 2, the convolutional neural network 200 may include alternating convolutional layers and pooling layers. These alternating layers may enable creation of multiple feature maps of various sizes. Each of the feature maps may correspond to one of a plurality of input image features, which may be used for performing grapheme recognition.

In certain implementations, the penultimate layer (e.g., the pooling layer 227B) of the convolutional neural network 200 may produce a feature vector representative of the features of the original image, which may be regarded as a representation of the original image in the multi-dimensional space of image features. Thus, the convolutional neural network 200 without the last fully connected-layer 229 may be considered as performing the functions of the feature extractor 130.

The feature vector produced by the feature extractor may be fed to the fully-connected output layer 229, which may generate a vector of class weights, such that each weight would characterize the degree of association of the input image with a grapheme class of a set of classes (e.g., a set of alphabet characters A, B, C, etc.). The vector of class weights may then be transformed, e.g., by a normalized exponential function, into a vector of probabilities, such that each probability would characterize a hypothesis of the input grapheme image representing an instance of a certain grapheme class of a set of classes.

In certain implementations, the vectors of class weights and/or probabilities produced by fully-connected output layer 229 may only be utilized for the network training, while in operation the feature vector produced by the penultimate layer (e.g., the pooling layer 227B) of the convolutional neural network 200 may be fed to the above-described confidence function, which produces a vector of confidence values, such that each confidence value (e.g., selected from the range of 0-1) reflects the level of confidence of the hypothesis of the input grapheme image representing an instance of a certain class of the set of classes. In certain implementations, the confidence value computed for each class of the set of classes by the confidence function may be represented by the distance between the feature vector of the input image and the center of the respective class.

However, in certain implementations, the computations may be optimized by employing the fully-connected output layer 229 to produce the vector of probabilities, and then compute the confidence values for a subset of classes consisting of a certain number of classes associated with the highest probability values or a subset of classes associated with probability values exceeding a threshold probability value.

The grapheme class associated with the highest confidence value may then be selected as the grapheme represented by the input image.

While FIG. 2 illustrates a certain number of layers of the convolutional neural network 200, convolutional neural networks employed in various alternative implementations may include any suitable numbers of convolutional layers, ReLU layers, pooling layers, and/or any other layers. The order of the layers, the number of the layers, the number of filters, and/or any other parameter of the convolutional neural network 200 may be adjusted (e.g., based on empirical data).

As noted herein above, the present disclosure provides training methods which ensure that the trained classifier 120 would not only efficiently distinguish the valid graphemes but also filter out the inputs which do not constitute valid grapheme images. Filtering out the inputs which do not constitute valid grapheme images may be performed by the grapheme recognizer which employs the trained classifier 120, based on the confidence values yielded by the above-described confidence function which computes the distances, in the image feature space, between the feature vector representing the input image and vectors representing centers of classes of a set of classes, and transforms the computed distances into a vector of confidence values, such that each confidence value (e.g., selected from the range of 0-1) reflects the level of confidence of the hypothesis of the input grapheme image representing an instance of a certain class of the set of grapheme classes. In certain implementations, if the highest confidence value falls below a certain threshold, the grapheme recognizer may return an error code indicating that the input image does not depict a valid grapheme (e.g., more than one grapheme and/or a grapheme from a different alphabet may be present in the input image).

Training the classifier 120 may involve processing batches of the images from a training dataset, which includes images of graphemes and respective class identifiers (e.g., characters of an alphabet or class numbers) reflecting the correct classification of the images. For each input image, the feature extractor 130 may generate a feature vector which may be fed to the next layer of the convolutional neural network, which would produce a vector of probabilities corresponding to the input image, such that each vector element characterizes a hypothesis of the input image representing an instance of a certain grapheme class of a set of classes. A value of a loss function is computed based on the observed output of the convolutional neural network (i.e., the vector of probabilities) and the desired output specified by the training dataset (e.g., the grapheme which is in fact shown by the input image, or, in other words the correct class identifier).

In an illustrative example, the loss function may be represented by the Cross Entropy Loss (CEL), which may be expressed as follows:

$$CEL = \Sigma_i - \ln p_{j_i}$$

where i is the number of input image in the batch of input images, $j_i$ is the correct class identifier (e.g., grapheme identifier) for the i-the input image, and $p_{j_i}$ is the probability produced by the neural network for i-th input image representing the j-th class (i.e., for the correct classification of the i-th input image).

The summing is performed by all input images from the current batch of input images. The identified classification error is propagated back to the previous layers of the convolutional neural network, in which the network parameters are adjusted accordingly. This process may be repeated until the value of the loss function would stabilize in the vicinity of a certain value or fall below a predetermined threshold. The neural network trained using the CEL loss function would place the instances of the same class along a certain vector in the feature space, thus facilitating efficient segregation of instances of different classes.

While CEL loss function may be adequate for distinguishing images of different graphemes, it may not always produce satisfactory results in filtering out invalid image graphemes. Accordingly, the Center Loss (CL) function may be employed in addition to the CEL function, thus compacting the representation of each class in the feature space, such that all instances of a given class would be located within a relatively small vicinity of a certain point, which would thus become the class center, while any feature representation of an invalid grapheme image would be located relatively further away (e.g., at a distance exceeding a pre-defined or dynamically configured threshold) from any class center.

In an illustrative example, the Center Loss function may be expressed as follows:

$$CL = \sum_i \|F_i - C_j\|_2$$

where i is the number of input image in the batch of input images, $F_i$ is the feature vector of the i-th input image, j is the correct class identifier (e.g., grapheme identifier) for the i-the input image, and $C_j$ is the vector of the center of the j-th class.

The summing is performed by all input images from the current batch of input images.

The center class vectors $C_j$ may be computed as the average of all features of the images which belong to the j-th class. As schematically illustrated by FIG. 1, the computed center class vectors 160 may be stored in the memory accessible by the grapheme recognizer 100.

In an illustrative example, the classifier 120 may be trained using a loss function represented by a linear combination of the CEL and CL functions, assuming zeroes as the initial values of the center class vectors. The values of the center class vectors may be re-computed after processing each training dataset (i.e., each batch of input images).

In another illustrative example, the classifier 120 may initially be trained using the CEL function, and initial values of the center class vectors may be computed after completing the initial training stage. The subsequent training may utilize a linear combination of the CEL and CL functions, and the values of the center class vectors may be re-computed after processing each training dataset (i.e., each batch of input images).

Employing a combination of CEL and CL functions for neural network training would produce compact representation of each class in the feature space, such that all instances of a given class would be located within a relatively small vicinity of a certain point, which would thus become the class center, while any feature representation of an invalid grapheme image would be located relatively further away (e.g., at a distance exceeding a pre-defined or dynamically configured threshold) from any class center.

In an illustrative example, the loss function L may be represented by a linear combination of CEL and CL functions, which may be expressed as follows:

$$L = CEL + \alpha * CL$$

where $\alpha$ is a weight coefficient the value of which may be adjusted to throttle the CL impact on the resulting loss function value, thus avoiding over-narrowing the feature range for instances of a given class.

The confidence function may be designed to ensure that the grapheme recognizer would assign low confidence values to invalid grapheme images. Accordingly, the confidence of associating a given image with a certain class (e.g., recognizing a certain grapheme in the image) would thus reflect the distance between the feature vector of the image and the center of the class, which may be expressed as follows:

$$d_k = \|F - C_k\|_2$$

where $d_k$ is the distance between the center $C_k$ of k-th class and the feature vector F of a given image.

The confidence function may be represented by a monotonically decreasing function of the distance between the class center and the feature vector of an input image in the space of image features. Thus, the further the feature vector is located from the class center, the less would be the confidence value assigned to associating the input image with this class.

In an illustrative example, the confidence function Q may be provided by a piecewise-linear function of the distance. The confidence function Q may be constructed by selecting certain confidence values $q_i$ and determining the corresponding distance values $d_i$ that would minimize the number of classification errors produced by the classifier processing a chosen validation dataset (which may be represented, e.g., by a set of document images (e.g., images of document pages) with associated metadata specifying the correct classification of the graphemes in the image). In certain implementations, the confidence values $q_i$ may be chosen at equal intervals within the valid range of confidence values (e.g., 0-1). Alternatively, the intervals between the confidence values $q_i$ may be chosen to increase while moving along the confidence value range towards to lowest confidence value, such that the intervals would be lower within a certain high confidence value range, while being higher within a certain low confidence value range.

Figure 3:
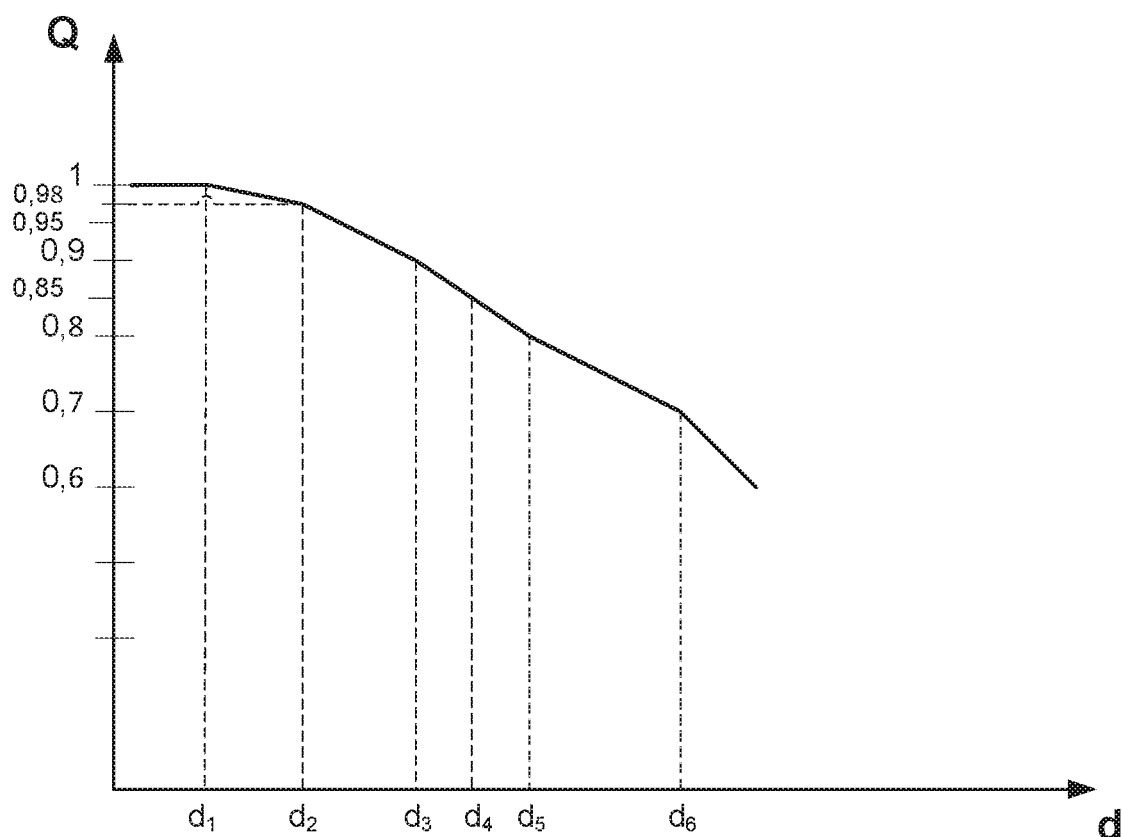
FIG. 3 schematically illustrates an example confidence function Q(d) implemented in accordance with one or more aspects of the present disclosure.

FIG. 3 schematically illustrates an example confidence function Q(d) implemented in accordance with one or more aspects of the present disclosure. As schematically illustrated by FIG. 3, the confidence values $q_k$ may be chosen at pre-selected intervals within the valid range of confidence values (e.g., 0-1), and then the corresponding values $d_k$ may be determined. If higher sensitivity of the function to its inputs in the higher range of function values is desired, the $q_k$ values within a certain high confidence value range may be selected at relatively small intervals (e.g., 1; 0.98; 0.95; 0.9; 0.85; 0.8; 0.7; 0.6; . . . ). The distances $\Delta_k$ between neighboring $d_k$ values (e.g., $d_k = d_{k-1} + \Delta_k$) may then be determined by applying optimization methods, such as the differential evolution method. The confidence function Q(d) may then be constructed as a piecewise linear function connecting the computed points ($d_k$, $q_k$).

In certain implementations, the confidence values may only be determined for a subset of the classification hypotheses which the classifier has associated with high probabilities (e.g., exceeding a certain threshold).

Using the above-described loss and confidence functions ensures that, for the majority of invalid grapheme images, low confidence values would be assigned to hypotheses associating the input images with all possible graphemes. A clear advantage of applying the above-described loss and confidence functions is training the classifier without requiring the presence of negative samples in the training dataset, since, as noted herein above, all possible variations of invalid images may be difficult to produce, and the number of such variations may significantly exceed the number of valid graphemes.

In certain implementations, a classifier trained using the above-described loss and confidence functions may still fail to filter out a small number of invalid grapheme images. For example, a hypothesis associating an invalid grapheme image with a certain class (i.e., erroneously recognizing a certain grapheme within the image) would receive a high confidence value if the feature vector of the invalid grapheme image is located within a relatively small vicinity of a center of the class. While the number of such errors tends to be relatively small, the above-described loss function may be enhanced in order to filter out such invalid grapheme images.

In an illustrative example, the above-described loss function represented by a linear combination of the CEL function and the CL function may be enhanced by introducing a third term, referred herein as Close-to-Center Penalty Loss (CCPL) function, which would cause the feature vectors of known types of invalid images be removed from the centers of all classes. Accordingly, the enhanced loss function may be expressed as follows:

$$L = CEL + \alpha^* CL + \beta^* CCPL$$

Training the neural network using the enhancing loss function which reflects the CCPL may involve iteratively processing batches of input images, such that each batch includes positive samples (images of valid graphemes) and negative samples (invalid grapheme images). In certain implementations, $CEL + \alpha^* CL$ term may be only computed for positive samples, while $\beta^* CCPL$ term may be only computed for negative samples.

Figure 4:
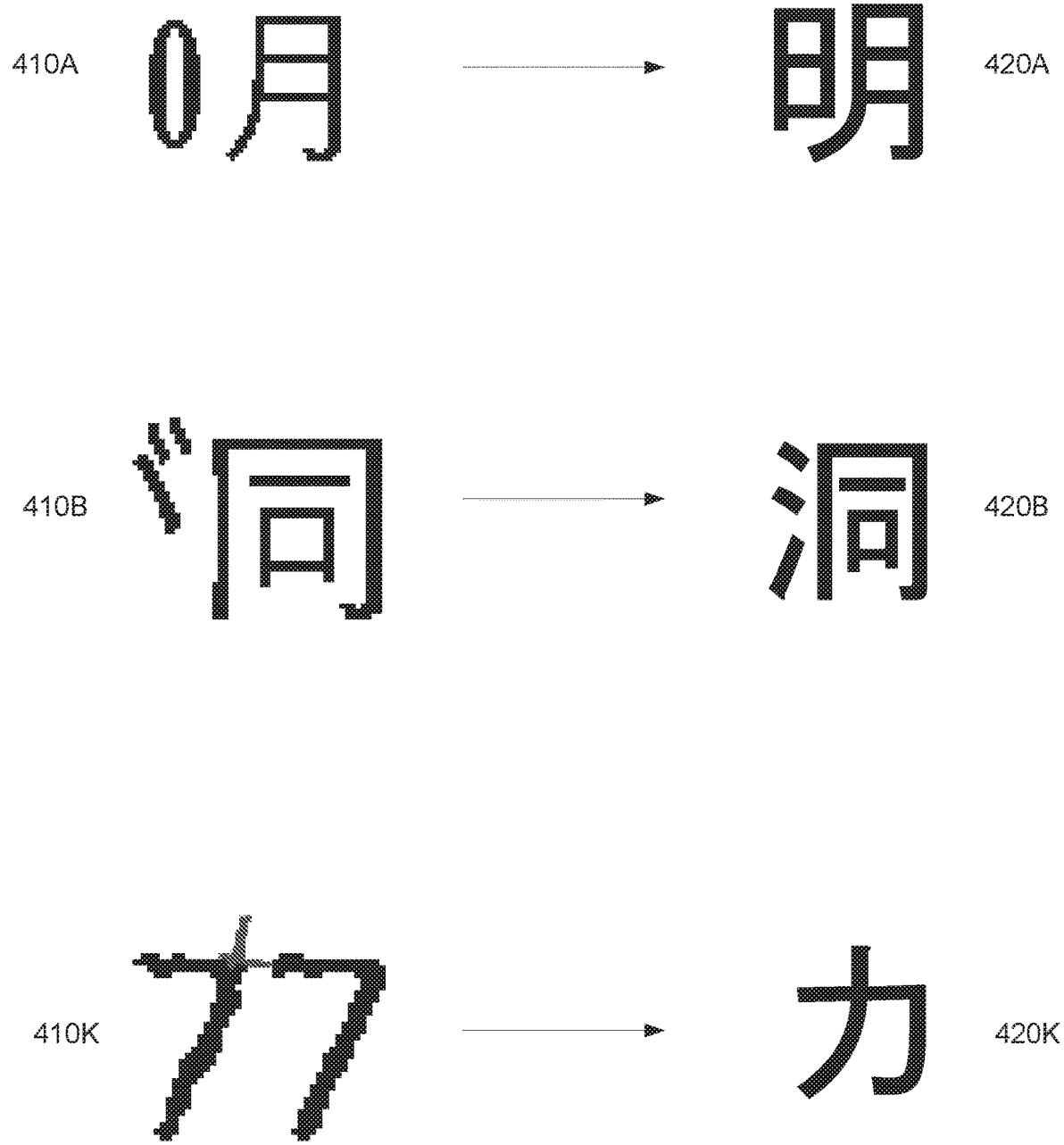
FIG. 4 schematically illustrates examples of invalid grapheme images and corresponding valid graphemes bearing visual resemblance with the respective invalid images, which may be utilized for training convolutional neural networks operating in accordance with one or more aspects of the present disclosure.

In an illustrative example, the training dataset may include the negative samples represented by real invalid grapheme images which were erroneously classified as valid images and assigned confidence values exceeding a certain pre-determined threshold. In another illustrative example, the training dataset may include the negative samples represented by synthetic invalid grapheme images. FIG. 4 schematically illustrates examples of invalid grapheme images 410A-410K and corresponding valid graphemes 420A-420K bearing visual resemblance with the respective invalid images.

The CCPL function, which is computed for negative training samples, may be expressed as follows:

$$CCPL = \sum_i \sum_j \max(0; A - \|F_j^{neg} - C_i\|_1)$$

where $F_j^{neg}$ is the feature vector for j-th negative training sample, $C_i$ is the center of the i-th class, and A is a pre-defined or adjustable parameter defining the size of the neighborhood of the class center (i.e., the distance to the class center) in the space of image features, such that the feature vectors located within the neighborhood are penalized, while the penalty would not be applied to the feature vectors located outside of the neighborhood.

Therefore, if the feature vector of a negative sample is located within a distance not exceeding the value of parameter A from the center of the i-th class, then the value of the CCPL function is incremented by that distance. Training the classifier involves minimizing the CCPL value. Accordingly, the trained classifier would, for an invalid grapheme image, yield a feature vector which is located outside of immediate vicinities of the centers of valid classes. In other words, the classifier is trained to distinguish between valid graphemes and invalid grapheme images.

As noted herein above, neural networks trained by the methods described herein may be utilized for performing various image classification tasks, including but not limited to the optical character recognition.

Figure 5:
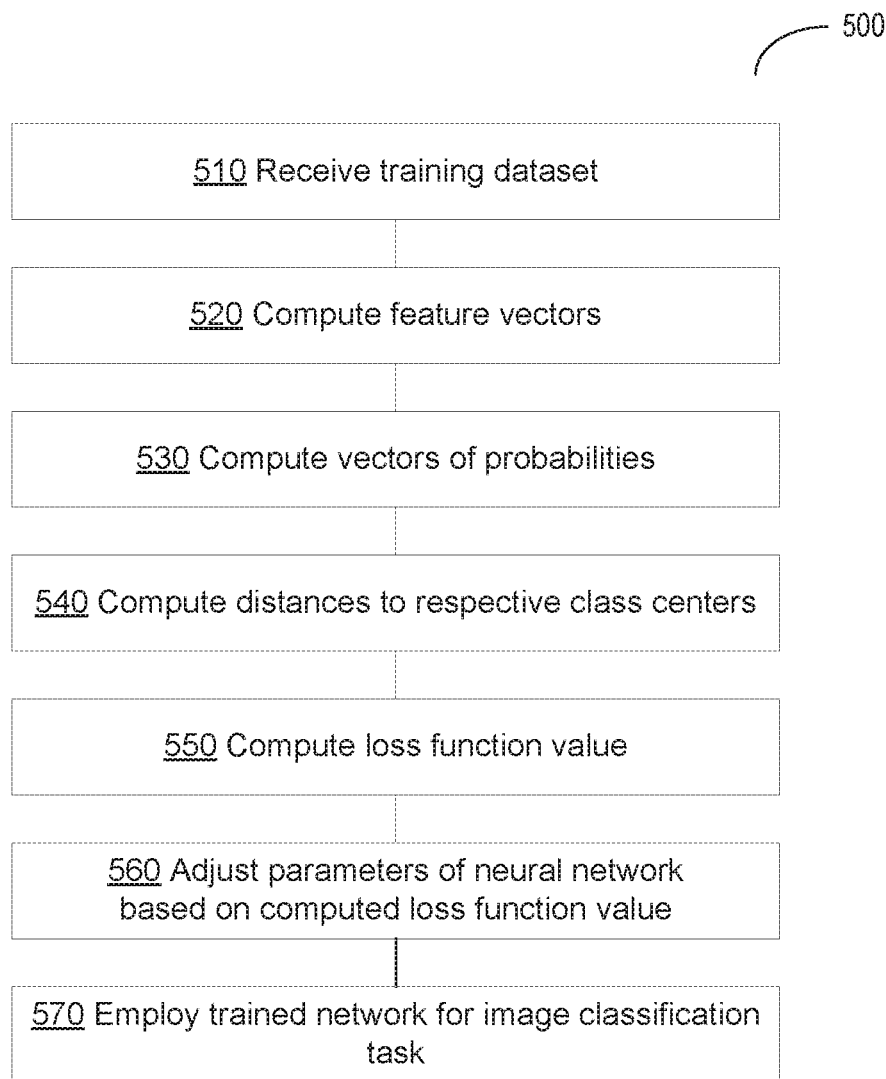
FIG. 5 depicts a flow diagram of an example method of neural network training utilizing specialized loss functions, in accordance with one or more aspects of the present disclosure.

FIG. 5 depicts a flow diagram of an example method 500 of neural network training utilizing specialized loss functions, in accordance with one or more aspects of the present disclosure. Method 500 and/or each of its individual functions, routines, subroutines, or operations may be performed by one or more processors of the computer system (e.g., example computer system 700 of FIG. 7) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, a computer system implementing the method may receive a training dataset comprising a plurality of images. Each image of the training dataset may be associated with metadata specifying the correct classification of the image, i.e., an identifier of a certain class of a set of classes (e.g, a character of an alphabet).

At block 520, the computer system may compute, for each image of the training dataset, a feature vector which may be regarded as a representation of the image in the multi-dimensional space of image features. In an illustrative example, the feature vector may be produced by the penultimate layer of the convolutional neural network which undergoes the training, as described in more detail herein above.

At block 530, the computer system may employ the neural network to compute, for each image of the training dataset, based on the feature vector representing the image, a vector of probabilities, each element of which represents the probability of a hypothesis associating the image with a corresponding class of the set of classes (i.e., the class identified by the index of the element of the vector). In an illustrative example, the classification may be performed by the fully-connected layer of the convolutional neural network, as described in more detail herein above.

At block 540, the computer system may compute, for each image of the training dataset, the distance, in the space of image features, between the feature vector representing the image and the center of the class associated with the image by the training dataset.

At block 550, the computer system may compute, for the training dataset, a value of the loss function. In an illustrative example, the loss function may be represented by a linear combination of the CEL and CL functions. The CEL function value may be determined based on the probabilities computed at block 530. The CL function value may be determined based on the distances computed at block 540, as described in more detail herein above.

In another illustrative example, the loss function is represented by a linear combination of a cross entropy loss function, a center loss function, and a close-to-center penalty loss function. The latter may be determined based on the computed distances between feature vectors of negative training samples and centers of the classes, as described in more detail herein above.

At block 560, the computer system may adjust, based on the computed value of the loss function, one or more parameters of the convolutional neural network which undergoes the training. In an illustrative example, the error reflected by the loss function value is back-propagated starting from the last layer of the convolutional neural network, and the weights and/or other network parameters are adjusted accordingly. In certain implementations, the operations of block 560 may include re-computing the values of the class centers in the space of the image features.

The process described by blocks 510-560 may be repeated until the value of the loss function would stabilize in a vicinity of a certain value or fall below a predetermined threshold or fall below a predetermined threshold.

At block 570, the computer system may employ the trained convolutional neural network for performing an image classification task (e.g., optical character recognition) of one or more input images, and the method may terminate.

Figure 6:
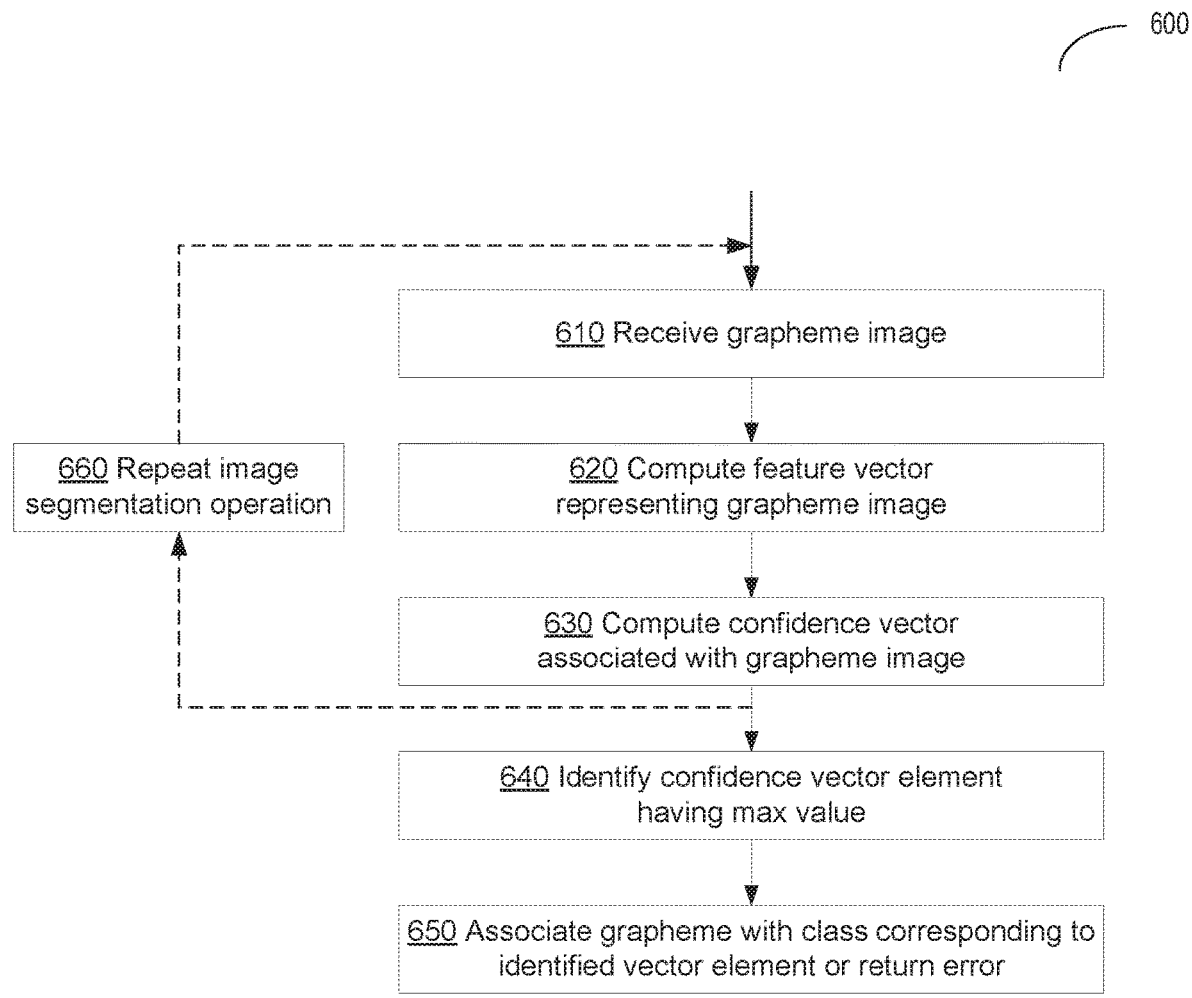
FIG. 6 depicts a flow diagram of an example method of neural-network-based optical character recognition using specialized confidence functions, in accordance with one or more aspects of the present disclosure.

FIG. 6 depicts a flow diagram of an example method 600 of neural-network-based optical character recognition using specialized confidence functions, in accordance with one or more aspects of the present disclosure. Method 600 and/or each of its individual functions, routines, subroutines, or operations may be performed by one or more processors of the computer system (e.g., example computer system 700 of FIG. 7) executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel and/or in arbitrary selected orders.

At block 610, a computer system implementing the method may receive a grapheme image to be recognized.

At block 620, the computer system may employ a neural network (e.g., a neural network having an architecture of the neural network 200 of FIG. 2) to compute a feature vector representing the grapheme image in a space of image features, as described in more detail herein above.

At block 630, the computer system may compute a confidence vector associated with the grapheme image. Each element of the confidence vector may reflect the distance, in the space of image features, between the feature vector and the center of a class of the set of grapheme classes, wherein the class is identified by an index of the element of the confidence vector.

In certain implementations, the computations performed at block 630 may be optimized by computing the confidence values for only a subset of classes consisting of a certain number of classes associated with the highest probability values yielded by the classifier or a subset of classes associated with probability values exceeding a threshold probability value. The confidence values of the remaining classes may be assumed to be equal to a pre-defined small value (e.g., 0).

At block 640, the computer system may identify the element having the maximum value among the elements of the confidence vector.

At block 650, the computer system may establish that the grapheme image represents an instance of the grapheme class corresponding to the identified element of the confidence vector, as described in more detail herein above. Alternatively, if the identified maximum confidence value falls below a certain threshold, the method may return an error code indicating that the input image cannot be recognized, as it does not depict a valid grapheme (e.g., more than one grapheme, a part of at least one grapheme and/or a grapheme from a different alphabet may be present in the input image). Upon completing the operations of method 650, the method may terminate.

In certain implementations, instead of performing operations 640-650, the method 600 may output the confidence vector, which may be further processed by the OCR system. In an illustrative example, the OCR system may utilize the received confidence vector for identifying the optimal image segmentation (block 660) followed by a final round of the character recognition operation (e.g., repeating operations

610-650 for the new input grapheme image produced by the identified optimal image segmentation), as schematically illustrated in FIG. 6 by the dashed line arrows.

Figure 7:
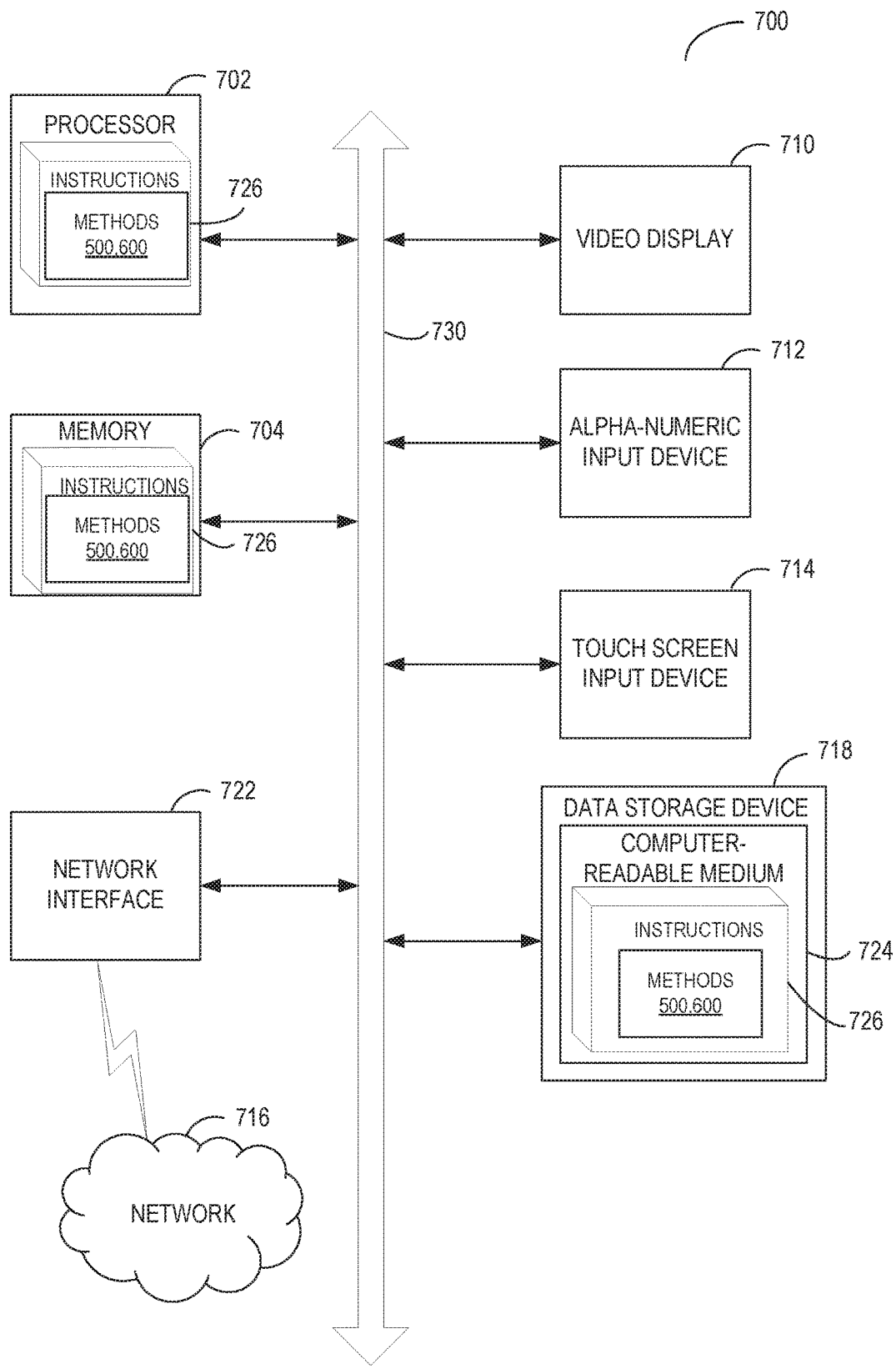
FIG. 7 depicts a component diagram of an example computer system which may be employed for implementing the methods described herein.

FIG. 7 depicts a component diagram of an example computer system which may be employed for implementing the methods described herein. The computer system 700 may be connected to other computer system in a LAN, an intranet, an extranet, or the Internet. The computer system 700 may operate in the capacity of a server or a client computer system in client-server network environment, or as a peer computer system in a peer-to-peer (or distributed) network environment. The computer system 700 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methods described herein.

Exemplary computer system 700 includes a processor 702, a main memory 704 (e.g., read-only memory (ROM) or dynamic random access memory (DRAM)), and a data storage device 718, which communicate with each other via a bus 730.

Processor 702 may be represented by one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute instructions 726 for performing the methods described herein.

Computer system 700 may further include a network interface device 722, a video display unit 710, a character input device 712 (e.g., a keyboard), and a touch screen input device 714.

Data storage device 718 may include a computer-readable storage medium 724 on which is stored one or more sets of instructions 726 embodying any one or more of the methods or functions described herein. Instructions 726 may also reside, completely or at least partially, within main memory 704 and/or within processor 702 during execution thereof by computer system 700, main memory 704 and processor 702 also constituting computer-readable storage media. Instructions 726 may further be transmitted or received over network 716 via network interface device 722.

In an illustrative example, instructions 726 may include instructions of method 500 of neural network training utilizing specialized loss functions, implemented in accordance with one or more aspects of the present disclosure. In another illustrative example, instructions 726 may include instructions of method 600 of neural-network-based optical character recognition using specialized confidence functions, implemented in accordance with one or more aspects of the present disclosure. While computer-readable storage medium 724 is shown in the example of FIG. 7 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, graphemes, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
receiving, by a computer system, a grapheme image;
computing a feature vector representing the grapheme image in a space of image features;
computing a confidence vector associated with the grapheme image, wherein each element of the confidence vector is produced by a monotonically decreasing function of a distance, in the space of image features, between the feature vector and a center of a class of a set of classes, wherein the monotonically decreasing function is based on a series of predefined confidence values, such that intervals between the predefined confidence values increase towards a lowest confidence value;
identifying an element having a maximum value among elements of the confidence vector; and
associating the grapheme image with a grapheme class corresponding to the identified element of the confidence vector.

2. The method of claim 1, further comprising:
responsive to determining that the maximum value falls below a threshold, returning an error code indicating that the grapheme image is not recognizable.

3. The method of claim 1, further comprising:
performing, in view of the confidence vector, segmentation of an original image to produce a second grapheme image; and
repeating, for the second grapheme image, operations of computing the feature vector and computing the confidence vector.

4. The method of claim 1, wherein each class of the set of classes corresponds to a character of an alphabet.

5. The method of claim 1, further comprising:
computing a set of class weights, such that each class weight characterizes a degree of association of the grapheme image with a certain class of a set of classes; and
computing, using a normalized exponential transformation, a set of probabilities corresponding to the set of class weights, such that each probability characterizes a hypothesis of the grapheme image representing an instance of a certain class of the set of classes.

6. The method of claim 5, wherein the confidence vector is determined for a subset of classes associated with highest probability values.

7. The method of claim 1, wherein computing the feature vector is performed by a neural network, the method further comprising:
training the neural network using a loss function represented by a linear combination of a cross entropy loss function and a center loss function.

8. A system, comprising:
a memory;
a processor, coupled to the memory, the processor configured to:
receive a grapheme image;
compute a feature vector representing the grapheme image in a space of image features;
compute a confidence vector associated with the grapheme image, wherein each element of the confidence vector is produced by a monotonically decreasing function of a distance, in the space of image features, between the feature vector and a center of a class of a set of classes, wherein the monotonically decreasing function is based on a series of predefined confidence values, such that intervals between the predefined confidence values increase towards a lowest confidence value;
identify an element having a maximum value among elements of the confidence vector; and
associate the grapheme image with a grapheme class corresponding to the identified element of the confidence vector.

9. The system of claim 8, wherein each class of the set of classes corresponds to a character of an alphabet.

10. The system of claim 8, wherein the processor is further configured to:
compute a set of class weights, such that each class weight characterizes a degree of association of the grapheme image with a certain class of a set of classes; and
compute a set of probabilities corresponding to the set of class weights, such that each probability characterizes a hypothesis of the grapheme image representing an instance of a certain class of the set of classes.

11. The system of claim 10, wherein the confidence vector is determined for a subset of classes associated with highest probability values.

12. The system of claim 8, wherein the processor is further configured to:
perform, in view of the confidence vector, segmentation of an original image to produce a second grapheme image; and
repeat, for the second grapheme image, operations of computing the feature vector and computing the confidence vector.

13. The system of claim 8, wherein the processor is further configured to:
responsive to determining that the maximum value falls below a threshold, return an error code indicating that the grapheme image is not recognizable.

14. A computer-readable non-transitory storage medium comprising executable instructions that, when executed by a computer system, cause the computer system to:
receive a grapheme image;
compute a feature vector representing the grapheme image in a space of image features;
compute a confidence vector associated with the grapheme image, wherein each element of the confidence vector is produced by a monotonically decreasing function of a distance, in the space of image features, between the feature vector and a center of a class of a set of classes, wherein the monotonically decreasing function is based on a series of predefined confidence values, such that intervals between the predefined confidence values increase towards a lowest confidence value;
identify an element having a maximum value among elements of the confidence vector; and associate the grapheme image with a grapheme class corresponding to the identified element of the confidence vector.

15. The computer-readable non-transitory storage medium of claim 14, further comprising executable instructions causing the computer system to:
   perform, in view of the confidence vector, segmentation of an original image to produce a second grapheme image; and
   repeat, for the second grapheme image, operations of computing the feature vector and computing the confidence vector.

16. The computer-readable non-transitory storage medium of claim 14, wherein each class of the set of classes corresponds to a character of an alphabet.

17. The computer-readable non-transitory storage medium of claim 14, further comprising executable instructions causing the computer system to:
   responsive to determining that the maximum value falls below a threshold, return an error code indicating that the grapheme image is not recognizable.

18. The computer-readable non-transitory storage medium of claim 14, further comprising executable instructions causing the computer system to:
   computing a set of class weights, such that each class weight characterizes a degree of association of the grapheme image with a certain class of a set of classes; and
   computing, using a normalized exponential transformation, a set of probabilities corresponding to the set of class weights, such that each probability characterizes a hypothesis of the grapheme image representing an instance of a certain class of the set of classes.

19. The computer-readable non-transitory storage medium of claim 14, wherein the confidence vector is determined for a subset of classes associated with highest probability values.

20. The computer-readable non-transitory storage medium of claim 14, wherein computing the feature vector is performed by a neural network that is trained using a loss function represented by a linear combination of a cross entropy loss function and a center loss function.

* * * * *